United States Patent [19]
Fujimura

[11] Patent Number: 6,083,304
[45] Date of Patent: Jul. 4, 2000

[54] METHOD AND APPARATUS FOR DEHUMIDIFYING AIR

[75] Inventor: Yasuyuki Fujimura, Zushi, Japan

[73] Assignee: Kankyo Co., Ltd., Kanagawa, Japan

[21] Appl. No.: 09/014,611

[22] Filed: Jan. 28, 1998

[51] Int. Cl.[7] .......................... B01D 15/02; B01D 53/06; B01D 53/26
[52] U.S. Cl. ................. 96/145; 96/150; 95/113; 95/114; 95/123; 95/124; 95/117
[58] Field of Search .............................. 95/114, 123, 124, 95/113, 117; 96/125, 126, 127, 130, 143, 144, 145, 150

[56] References Cited

U.S. PATENT DOCUMENTS

| | | | |
|---|---|---|---|
| 4,926,618 | 5/1990 | Ratliff | 95/113 |
| 5,040,375 | 8/1991 | Von Dobeln . | |

FOREIGN PATENT DOCUMENTS

| | | | |
|---|---|---|---|
| 0025342A1 | 3/1981 | European Pat. Off. . | |
| 0051501A1 | 5/1982 | European Pat. Off. . | |
| 52-19362 | 2/1977 | Japan | 95/113 |
| 58-118799 | 7/1983 | Japan . | |
| 61-212311 | 9/1986 | Japan . | |
| 1-176426 | 7/1989 | Japan | 95/124 |
| 6-324015 | 11/1994 | Japan . | |
| 8-155247 | 6/1996 | Japan . | |
| 2165465 | 4/1986 | United Kingdom . | |
| 2251393A | 7/1992 | United Kingdom . | |
| 2295332 | 5/1996 | United Kingdom . | |
| 2295332A | 5/1996 | United Kingdom . | |

*Primary Examiner*—David A. Simmons
*Assistant Examiner*—Robert A. Hopkins
*Attorney, Agent, or Firm*—Birch, Stewart, Kolasch & Birch, LLP

[57] ABSTRACT

A novel method and apparatus to dehumidify air provides enhanced dehumidification efficiency over conventional dehumidification apparatuses. A reusable dehumidification element disk provides a disk section to strip water from an air stream. The disk is rotated so that the saturated disk section enters a separate chamber where the water can be stripped from the disk with a stream of regeneration air. The regeneration air stream is recycled and is not split from or mixed with the air stream requiring dehumidification. The result is a more efficient dehumidification than in apparatuses which require the influent air stream to be divided into separate streams for dehumidification and regeneration functions.

18 Claims, 15 Drawing Sheets

METHOD AND APPARATUS FOR DEHUMIDIFYING AIR

BACKGROUND OF THE INVENTION

I. Field of the Invention

The present invention relates to a method and apparatus for dehumidifying air.

II. Description of the Related Art

A conventional dehumidification apparatus is disclosed in Japanese Laid-open Patent Application (Kokai) No. H8-155247.

As shown in FIGS. 1 and 2, with the dehumidification apparatus disclosed in Japanese Laid-open Patent Application (Kokai) No. 6-324015, a part of the air to be dehumidified, which was inhaled into a housing B of the apparatus by a fan A is transferred to a dehumidification rotor C rotatably mounted in the housing B. After dehumidification by the rotor C, the dehumidified air is discharged to the outside of the housing B. The other part of the inhaled air is passed through passages F of a heat exchanger E and then transferred to the dehumidification rotor C through a heater G to regenerate the dehumidification rotor C. The air humidified by the regeneration of the dehumidification rotor C is then sent to passages H of the heat exchanger E so as to condense the moisture, and the water generated by the condensation of moisture is removed.

However, this apparatus has the following drawbacks:

First, since the humid air generated by the regeneration of the dehumidification rotor C is cooled in the passages H of the heat exchanger E by the air in the vicinity of the housing B to the temperature not higher than the dew point, the air at the exit of the passages H has a temperature somewhat higher than the ambient temperature and has a relative humidity of 100%, so that it contains more moisture than the air in the vicinity of the housing B. Thus, since this humid air cooled by the heat exchanger is discharged to the outside of the housing B as it is, the dehumidification efficiency is not high. Even if the humid air is not discharged but inhaled by the fan A, the humid air is mixed with the air in the vicinity of the housing B, the dehumidification efficiency cannot be greatly promoted.

Second, since the air inhaled by the fan A is divided into two streams and sent to the dehumidification rotor C and heat exchanger E, respectively, the pressure at the entrance of passages K of the dehumidification rotor C is about the same as the pressure at the entrance of the passages F of the heat exchanger E, and the pressure is higher than that of the air in the vicinity of the housing B. The air sent to the passages F of the heat exchanger E is sequentially passed through the heater G, the passages I of the dehumidification rotor C and the passages H of the heat exchanger E, the pressure is sequentially decreased accordingly, and the pressure of the discharged air is about the same as the air in the vicinity of the housing B. Thus, the pressure at the exit of the passages I of the dehumidification rotor C is lower than the entrance of the passages K of the dehumidification rotor C.

Therefore, the air in the vicinity of the entrance of the passages K of the dehumidification rotor C flows to the exit of the passages I of the dehumidification rotor C and the temperature and humidity of the humid air generated at the dehumidification rotor C are both decreased, so that the amount of the removed moisture is decreased.

Third, since the air discharged from the passages K of the dehumidification rotor C is immediately discharged to the outside of the housing B, the pressure in the vicinity of the exit of the passages K of the dehumidification rotor C is about the same as the pressure outside the housing B. Thus, the pressure at the entrance of the passages I of the dehumidification rotor C is higher than the pressure at the exit of the passages K of the dehumidification rotor C. Therefore, a part of the air heated by the heater G in the vicinity of the entrance of the passages I of the dehumidification rotor C flows to the exit of the passages K of the dehumidification rotor C and the amount of the humid air generated by the dehumidification rotor C is decreased, so that the amount of the removed moisture is decreased.

SUMMARY OF THE INVENTION

Accordingly, an object of the present invention is to provide a method and apparatus for dehumidifying air by which air is dehumidified with a higher efficiency than the conventional dehumidification apparatuses.

The present inventor intensively studied to discover that the dehumidification efficiency can be promoted by providing air used entirely for regeneration of the dehumidification rotor and by substantially separating the air for regeneration of the dehumidification rotor from the air to be dehumidified and from the dehumidified air, thereby completing the present invention.

That is, the present invention provides a method for dehumidifying air comprising the steps of:

(i) contacting a dehumidification element which reversibly absorbs moisture in the air and which is contained in a housing of a dehumidification apparatus, with the air to be dehumidified;

(ii) discharging air to the outside of said housing, which air was dehumidified by the contact with said dehumidification element;

(iii) regenerating said dehumidification element by contacting said dehumidification element after absorbing the moisture in said air with heated air for regeneration of the dehumidification element so as to remove the moisture from said dehumidification element;

(iv) reusing the dehumidification element in the step (i), which was regenerated by the step (iii);

(v) cooling the air for regeneration of the dehumidification element after removing moisture from the dehumidification element in the step (iii) so as to condense the moisture, and removing the generated water from the air for regeneration of the dehumidification element; and p1 (vi) circulating the air for regeneration of the dehumidification element from the step (v) from which the water generated by condensation of moisture was removed, to the step (iii);

said air for regeneration of the dehumidification element is not substantially mixed with the air to be dehumidified or with the dehumidified air.

The present invention also provides a dehumidification apparatus comprising:

a housing;

a dehumidification element which reversibly absorbs moisture in the air;

a passage for circulating air for regeneration of the dehumidification element, which is communicated to said dehumidification element;

means for introducing the air to be dehumidified to said dehumidification element; and a dehumidified air-discharging passage for discharging the air dehumidified by said dehumidification element to the outside of said housing, which is communicated to said dehumidification element and to the outside of said housing;

said passage for circulating air for regeneration of the dehumidification element is provided with means for cooling the air for regeneration of the dehumidification element after regenerating the dehumidification element so as to condense the moisture removed from the dehumidification element; means for removing water generated by condensation of moisture from the air for regeneration of the dehumidification element; a heater for heating the air for regeneration of the dehumidification element after removing the water generated by condensation of moisture; and driving means for circulating the air for regeneration of the dehumidification element;

said passage for circulating air for regeneration of the dehumidification element is closed anywhere except for the vicinity of said dehumidification element.

By the present invention, since the air entirely used for regeneration of the dehumidification element is separately employed and is circulated without being discarded and without being substantially mixed with the air to be dehumidified or with the dehumidified air, the dehumidification efficiency is significantly higher than those with the conventional dehumidification apparatuses.

DETAILED DESCRIPTION OF THE PREFERRED EMBODIMENTS

Figure 1:
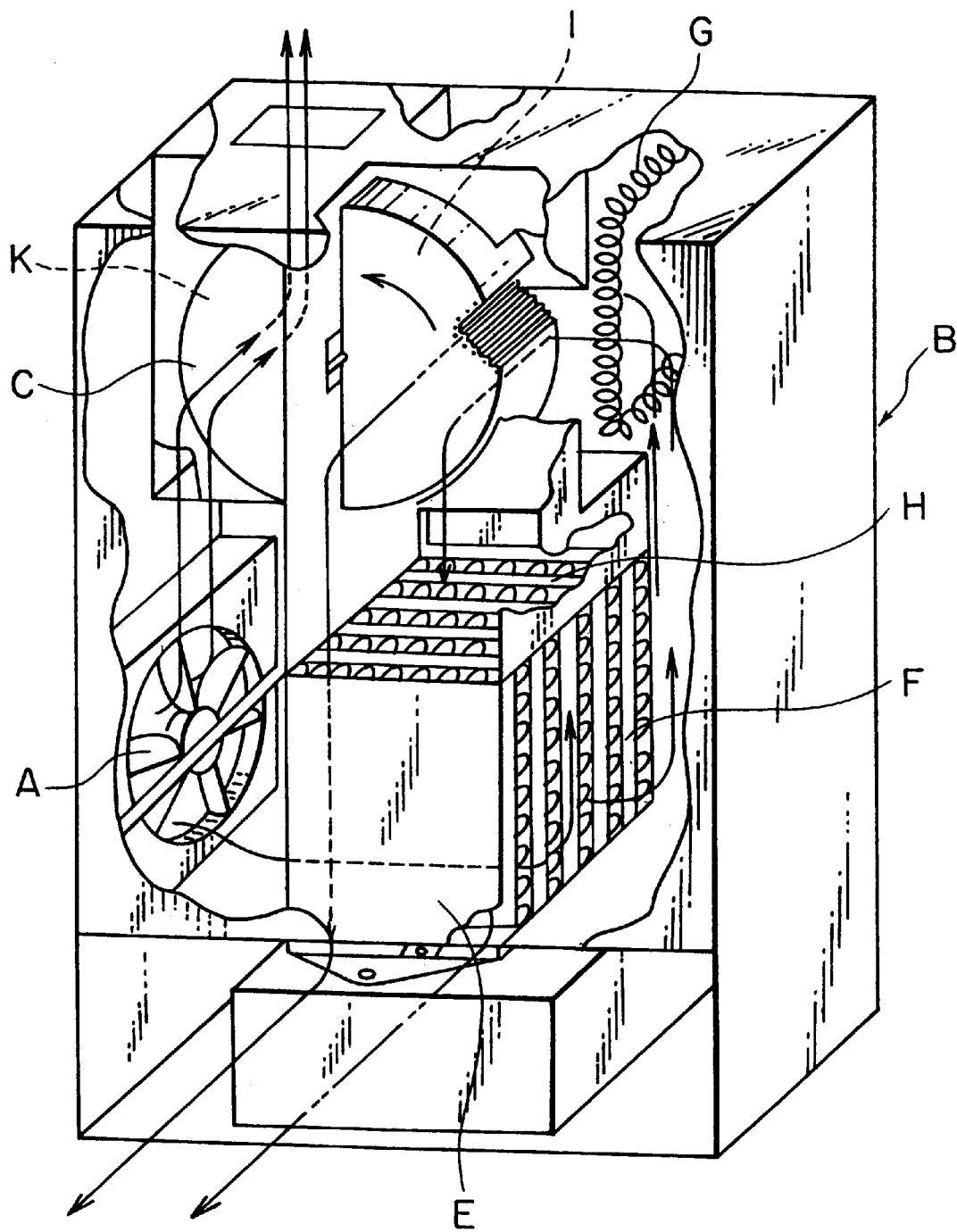
FIG. 1 is a partially cut off perspective view of a known dehumidification apparatus.
Figure 2:
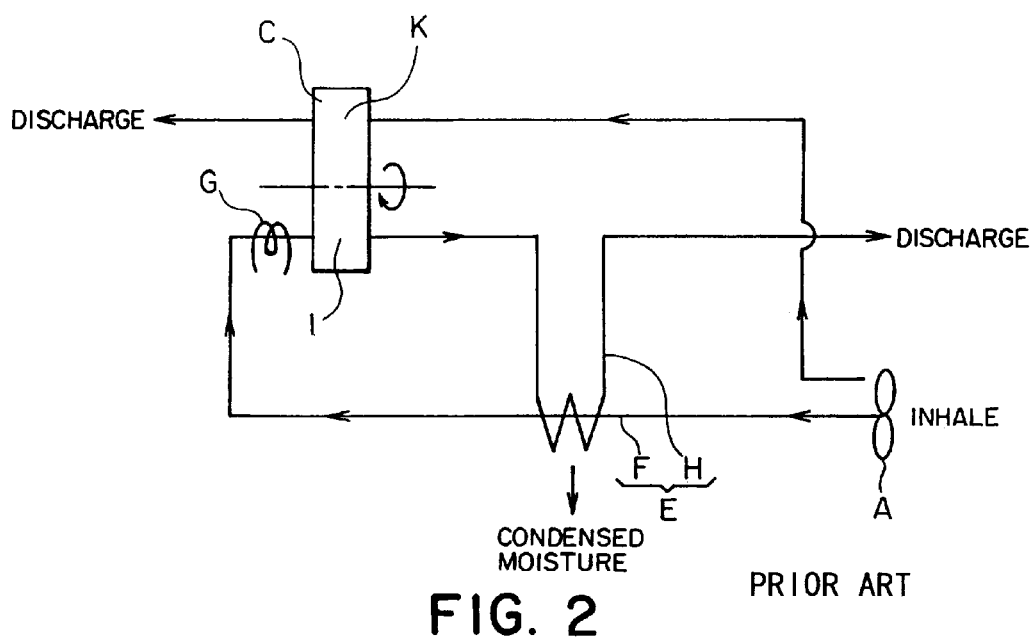
FIG. 2 shows a circuit of the known dehumidification apparatus shown in FIG. 1.

In the method for dehumidifying air according to the present invention, a dehumidification element (hereinafter also referred to as "DE" for short) contained in a housing of a dehumidification apparatus which will be described in detail later, is used. The DE has a moisture-absorbing material at least at its surfaces. The moisture-absorbing material may be any of the known moisture-absorbing materials including calcium chloride, lithium chloride, silica gel, molecular sieves and the like. The DE may be coated with or impregnated with such a moisture-absorbing material. Alternatively, the entire DE may be made of such a moisture-absorbing material. The DE preferably has a number of passages penetrating therethrough. In this case, the surfaces of the inner walls of the passages has the above-mentioned moisture-absorbing material. The passages may preferably have a diameter of 0.5–3 mm, although the diameter is not restricted to this range. The DE may preferably in the form of a plate or block, more preferably in the form of a disk. In this case, the passages may preferably be formed in the direction of thickness thereof. Such a DE may easily be prepared by spirally winding a corrugated board and coating the moisture-absorbing material on the inner side of the passages formed of the corrugated structure of the board.

In step (i) of the dehumidification method according to the present invention, the air to be dehumidified is introduced to the DE by a fan or the like and is made to contact the moisture-absorbing material. In a preferred embodiment, the air is made to pass through the passages formed in the DE. In the case where the DE is in the form of a plate or block and has a number of passages therethrough, the air is made to pass through the passages and reach the opposite side of the DE. During the passing through, the moisture in the air is absorbed by the moisture-absorbing material at the surfaces of the passages of the DE, so that the air is dehumidified. The air to be dehumidified may be made to contact the entire DE or a part of the DE, and the latter is preferred as will be described hereinbelow.

In step (ii), the dehumidified air is discharged to the outside of the housing of the dehumidification apparatus.

In step (iii), the DE after dehumidifying the air is regenerated by removing the moisture absorbed by the moisture-absorbing material of the DE. In the method of the present invention, air entirely used for regeneration of the DE is employed (this air is hereinafter also referred to as "DE-regenerating air" for short). The DE is regenerated by being made to contact the heated DE-regenerating air. By the contact with the heated DE-regenerating air, the moisture contained in the moisture-absorbing material of the DE is given to the heated DE-regenerating air, so that the DE is regenerated. In the preferred embodiment wherein the DE is in the form of a plate or block having a number of passages penetrating therethrough in the direction of thickness thereof, the DE-regenerating air is also made to pass through the passages so as to reach the other side of the DE, in the same manner as in the air to be dehumidified mentioned above.

In step (iv), the thus regenerated DE is reused in the above-mentioned step (i).

In step (v), the DE-regenerating air after regeneration of the DE in step (iii) is cooled to condense the moisture contained therein, and the water generated by the condensation of the moisture is removed from the DE-regenerating air. The DE-regenerating air may preferably be cooled by exchanging heat with the air to be dehumidified which is in the way to the DE in a heat exchanger. Before exchanging heat with the air to be dehumidified, the DE-regenerating air after regeneration of the DE may preferably be subjected to heat exchange with the DE-regenerating air to be heated for regenerating the DE. By step (v), the DE-regenerating air is dehumidified.

In step (vi), the thus dehumidified DE-regenerating air is circulated to the DE and used for regenerating the DE in step (iii) after being heated with a heater. Before being heated with a heater, the DE-regenerating air may preferably be heated by exchanging heat with the DE-regenerating air which is to be cooled in a heat exchanger as mentioned above. The DE-regenerating air may preferably be heated to a temperature of 60° C. to 300° C., although the temperature of the heated DE-regenerating air is not restricted thereto.

Thus, the regenerated DE in step (iii) is reused in step (i) (this reusing step is designated as step (iv)), and the DE-regenerated air dehumidified in step (v) is reused in step (iii). Therefore, the steps (i) to (vi) described above may be repeated continuously.

In the dehumidification method according to the present invention, it is an important feature that the DE-regenerating air is not substantially mixed with the air to be dehumidified or with the dehumidified air to be discharged to the outside of the housing. This is accomplished by the fact that the route of the DE-regenerating air is completely closed except for the vicinity of the DE, so that the DE-regenerating air does not contact the air to be dehumidified or the dehumidified air at all except for in the vicinity of the DE. In the vicinity of the DE, although the DE-regenerating air may more or less contact the air to be dehumidified and with the dehumidified air, by appropriately designing the DE and the structure in the vicinity of DE as described below, the mixing of the DE-regenerating air and the air to be dehumidified or the dehumidified air may be substantially avoided. Therefore, in the dehumidification method according to the present invention, the DE-regenerating air is not substantially mixed with the air to be dehumidified or with the dehumidified air to be discharged to the outside of the housing.

Figure 3:
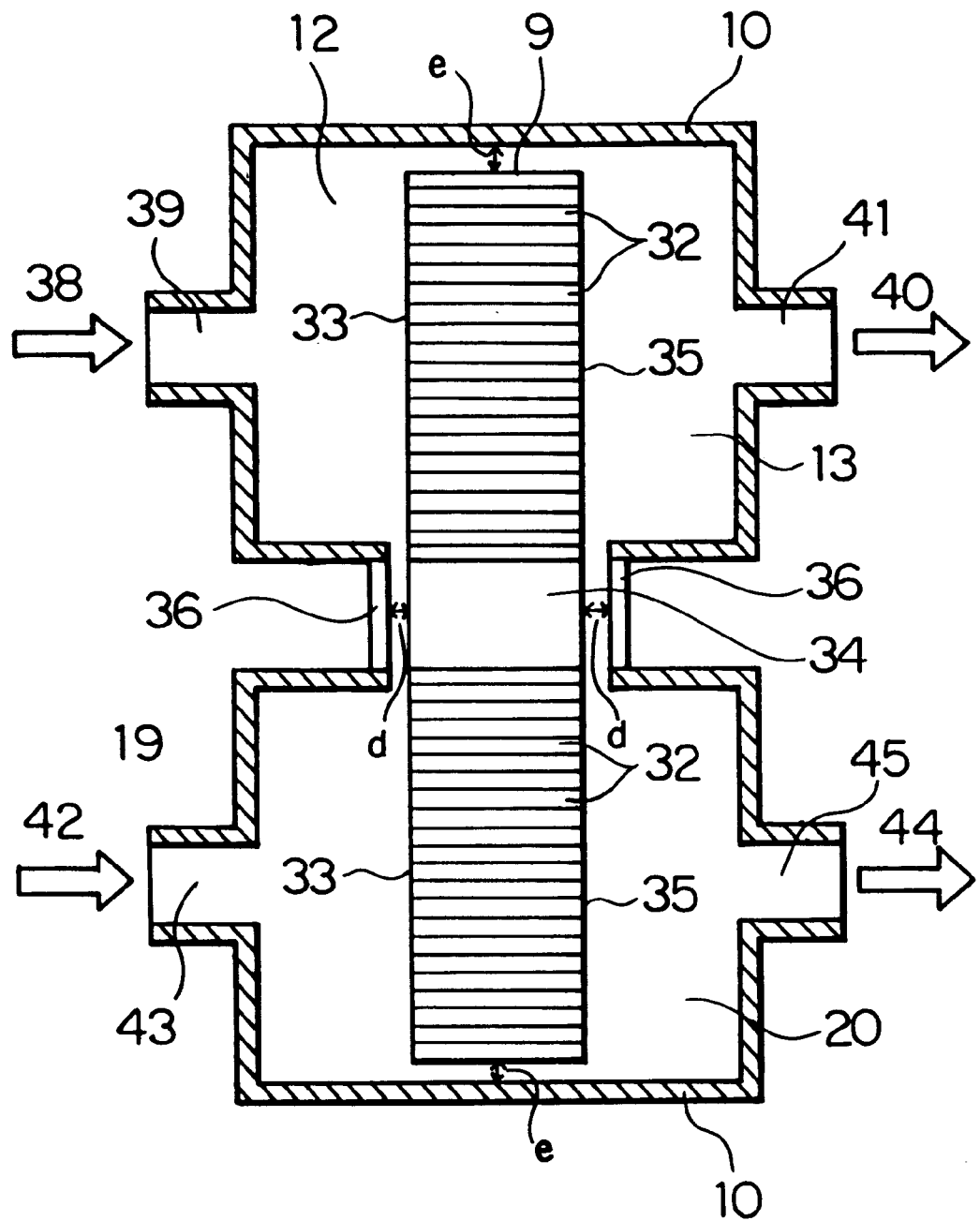
FIG. 3 shows a preferred embodiment of the dehumidification dehumidification element and the structure in the vicinity of the dehumidification element, which may be employed in the present invention.

A preferred embodiment for continuously carrying out the steps (i) to (vi) will now be described referring to FIG. 3 showing the DE and the structure in the vicinity thereof.

In this preferred embodiment, the DE 9 is in the form of a disk and a number of passages 32 penetrate the disk in the direction of the thickness of the disk (in FIG. 3, in the direction of left to right). As mentioned above, a moisture-absorbing material is coated on the inner walls of the passages 32. In the center of the DE 9, a penetrating hole 34 for receiving a rotating shaft (not shown) is formed. A surface 33 of the DE 9 at which the passages 32 are opened is herein called a first surface (in FIG. 3, the left side of the disk) and the surface 35 of the disk opposite to the first surface 33 is herein called a second surface. A region of the first surface 33 of the DE 9 is covered with a first chamber 12 and another region of the first surface 33 is covered with a second chamber 19. The region of the second surface 35 of the DE 9 opposite to the first chamber 12 is covered with a third chamber 13 and the region of the second surface 35 of the DE 9 opposite to the second chamber 19 is covered with a fourth chamber 20. The first chamber 12 and the second chamber 19 are connected through a separation portion 36, and similarly, the third chamber 13 and the fourth chamber 20 are connected through a separation portion 36. In a preferred embodiment as shown in FIG. 3, the first to fourth chambers are formed by providing hollow portions in a cover 10 which encloses the entire DE.

In operation, air to be dehumidified is introduced into the first chamber 12 as shown by an arrow 38 through an inlet 39. The air to be dehumidified passes through the passages 32 to reach the third chamber 13. During the air passes through the passages 32, the moisture contained in the air is absorbed by the moisture-absorbing material coated on the surfaces of the passages 32, so that the air which reached the third chamber 13 has been dehumidified. The thus dehumidified air is then discharged from the third chamber 13 as shown by an arrow 40 through an outlet 41 to the outside of the housing 1a through a dehumidified air-discharging passage (not shown).

Simultaneously, the heated DE-regenerating air is introduced into the second chamber 19 as shown by an arrow 42 through an inlet 43 and passes through the passages 32 to reach the fourth chamber 20. Since the DE-regenerating air introduced into the third chamber 19 has been heated, the DE-regenerating air passing through the passages 32 receives moisture from the moisture-absorbing material, so that this region of the DE 9 is regenerated. The DE-regenerating air after regeneration of the DE 9 is then discharged from the fourth chamber 20 as shown by an arrow 44 through an outlet 45. The DE-regenerating air discharged from the fourth chamber 20 is then cooled to condense the moisture, then heated as mentioned above, and then introduced again into the second chamber 19 as shown by the arrow 42. It should be noted that the DE-regenerating air may be introduced into the fourth chamber 20 and may be discharged from the third chamber 19 after regeneration of the DE 9.

In the embodiment shown in FIG. 3, the DE 9 in the form of a disk rotates in the plane perpendicular to the drawing sheet, about the rotation shaft (not shown) received in the through hole 34. Therefore, the regions covered with the first chamber 12 and the third chamber 13, respectively, are moved to the position covered with the second chamber 19 and the fourth chamber 20, respectively. By this rotation, the region of the DE 9 which received moisture from the air to be dehumidified is moved to the position at which the DE 9 is regenerated, and simultaneously, the regenerated region of the DE 9 is moved to the position at which the DE 9 receives moisture from the air to be dehumidified. Thus, the above-mentioned steps (i) to (vi) may be repeated continuously.

The rotation of the DE 9 may be carried out by utilizing the weight of the moisture given to the moisture-absorbing material. That is, the region of the DE 9 which received the moisture from the air to be dehumidified is heavier than the regenerated region of the DE 9. Therefore, as shown in FIG. 3, the region which received the moisture is in a higher position than the regenerated region, and the DE 9 naturally rotates because of the gravity. Thus, in this embodiment, the DE 9 may be rotated without any driving motor or the like. Alternatively, the DE 9 may be rotated by a driving motor. In this case, the DE 9 may be rotated continuously or intermittently.

In the dehumidification method according to the present invention, the circulation route of the DE-regenerating air is completely closed except for in the vicinity of the DE 9. Therefore, the DE-regenerating air is not mixed at all with any air in the circulation route except for in the vicinity of the DE 9. In the vicinity of the DE 9, since the inner side of the first chamber 12 and the inner side of the second chamber 19 are connected through a gap between the separation portion 36 and the first surface 33 of the DE 9, and since the inner side of the third chamber 13 and the inner side of the fourth chamber 20 are connected through a gap between the separation portion 36 and the second surface 35 of the DE 9, the DE-regenerating air may be more or less mixed with the air to be dehumidified and with the dehumidified air. However, since the pressure in the first chamber 12 and the second chamber 19 is about the same, and since the pressure in the third chamber 13 and the fourth chamber 20 is about the same, the mixing of the DE-generating air with the air to be dehumidified or the dehumidified air does not substantially occur. Further, by making the distance "d" of the gap between the separation portion 36 and the first surface 33, and of the gap between the separation portion 36 and the second surface 35 to be small, preferably 1 mm to 4 mm, the mixing of the DE-regenerating air with the air to be dehumidified or with the dehumidified air is substantially avoided, so that the dehumidification efficiency is not substantially decreased. The fact that the mixing does not substantially occur even if the distance "d" is as large as 4 mm is an important advantage of the present invention, because in the known apparatus which does not employ the DE-regenerating air separately, the dehumidification efficiency is decreased by 10% if the distance "d" is increased by 1 mm. Therefore, according to the present invention, the tolerance of the dimensions of the DE 9 and the cover 10 is large, which is very advantageous in assembling the apparatus.

Alternatively, by providing a separation strip (not shown) made of a flexible rubber or a plastic film in the gap so as to separate the first chamber 12 and the second chamber 19, and the third chamber 13 and the fourth chamber 20, respectively, the mixing of the DE-regenerating air with the air to be dehumidified or with the dehumidified air is completely avoided. In this case, the DE 9 may preferably be rotated by a driving motor in order to overcome the friction between the separation strip and the DE 9. It should be noted that in the embodiment shown in FIG. 3, the distance "e" of the gap between the upper portion of the DE 9 and the cover 10, and the gap between the lower portion of the DE 9 and the cover 10, may also be preferably as small as possible, preferably 1 mm to 4 mm in order to substantially prevent the air to be dehumidified from being directly transferring to the third chamber 13 without passing through the passages 32, and in order to substantially prevent the heated DE-regenerating air from being directly transferring to the fourth chamber 20 without passing through the passages 32.

Figure 4:
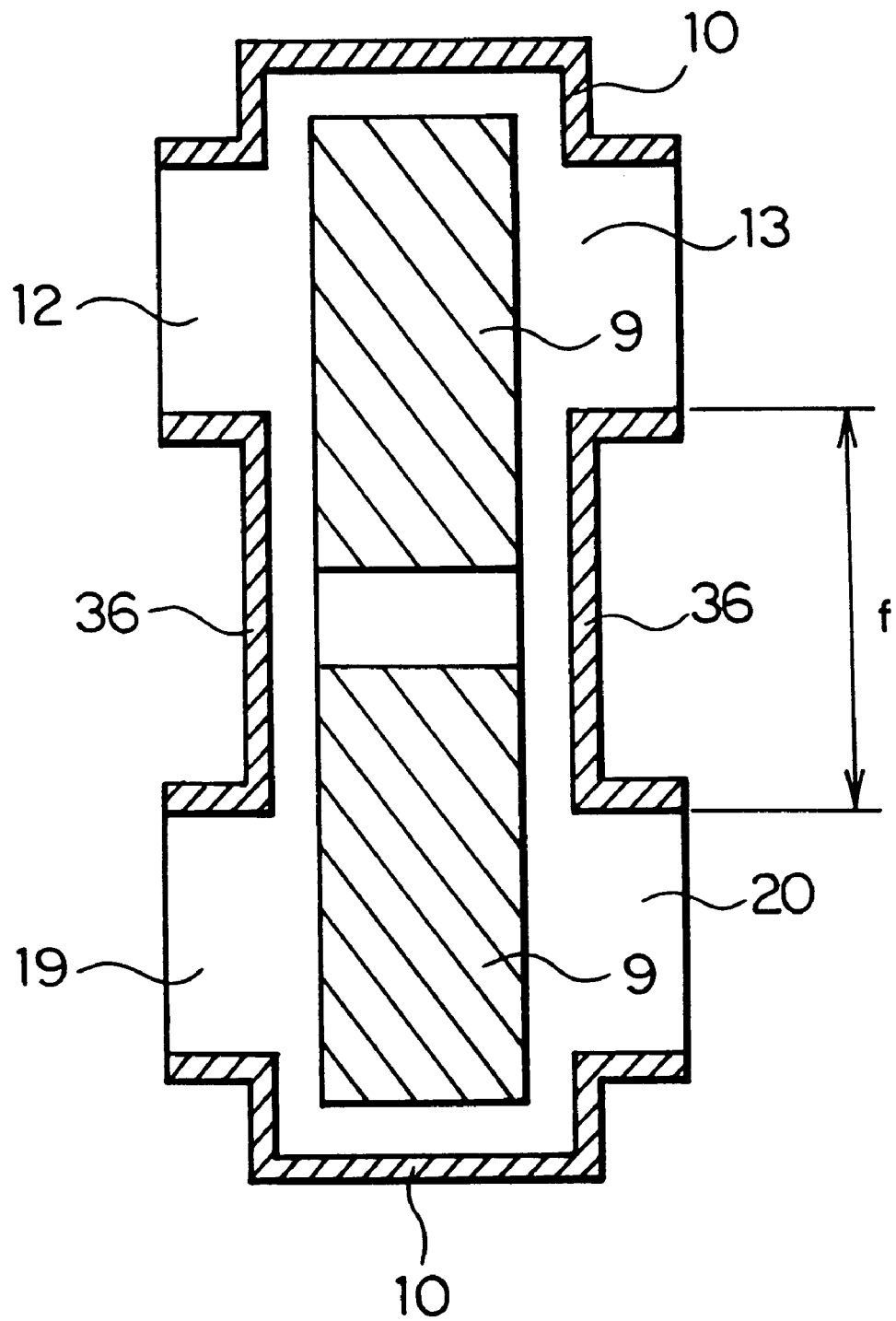
FIG. 4 is another preferred embodiment of the dehumidification element and the structure in the vicinity of the dehumidification element, which may be employed in the present invention.

The mixing of the DE-regenerating air with the air to be dehumidified or with the dehumidified air may also be almost completely avoided by a preferred embodiment shown in FIG. 4. In this embodiment, the entire DE 9 is enclosed in a cover 10 and the first to fourth chambers are formed by providing hollow portions, and the first to fourth chambers are spaced apart from each other. That is, the first chamber 12 and the second chamber 19 are spaced apart with a distance "f", and the third chamber 13 and the fourth chamber 20 are spaced apart with a distance "f". The distance "f" is larger than in the embodiment shown in FIG. 3. With the embodiment shown in FIG. 4, since the distance "f" is large, the mixing of the DE-regenerating air with the air to be dehumidified or with the dehumidified air is substantially avoided. In this embodiment, the distance "f" may preferably be not shorter than the thickness of the DE, more preferably 1 to 5 times the thickness of the DE. Further, as shown in FIG. 4, the inlet or the outlet provided in each of the chambers may have the size equal to the chamber.

The apparatus for carrying out the above-described dehumidification method will now be described.

The dehumidification apparatus according to the present invention comprises a housing; a DE which reversibly absorbs moisture in the air; a passage for circulating the DE-regenerating air, which is communicated to the dehumidification element; means for introducing the air to be dehumidified to the DE; and a dehumidified air-discharging passage for discharging the air dehumidified by the DE to the outside of the housing, which is communicated to the dehumidification element and to the outside of the housing. The passage for circulating DE-regenerating air is provided with means for cooling the DE-regenerating air after regenerating the dehumidification element so as to condense the moisture removed from the DE; means for removing water generated by condensation of moisture from DE-regenerating air; a heater for heating the DE-regenerating air after removing the water generated by condensation of moisture; and driving means for circulating the DE-regenerating air. The passage for circulating the DE-regenerating air is closed everywhere except for the vicinity of the DE, so that the mixing of the DE-regenerating air with the air to be dehumidified or with the dehumidified air is substantially avoided, as described above.

A preferred embodiment of the dehumidification apparatus according to the present invention will now be described referring to FIG. 5.

The dehumidification apparatus 1 has a housing 1a in the form of a box. On the bottom of the housing 1a, a container 2 for receiving the water generated by condensation of moisture in the DE-regenerating air after regeneration of the DE 9 is placed.

On the container 2, a first fan 4 and a second fan 5 are mounted, which are rotated by a fan motor 3. The air outside the housing 1a is inhaled into the housing 1a by the first fan 4 and is sent to a DE which is in the form of a dehumidification rotor 9 in this embodiment, through passages 6a of a heat exchanger 6 placed on the container 2, a chamber 7, and a duct 8. The passages 6a are the passages of the heat exchanger, which are the lower half of the passages running horizontally in the heat exchanger.

The dehumidification rotor 9 is in the form of a disk and rotatably mounted in a cover 10 enclosing the entire dehumidification rotor 9, the cover being called a dehumidification rotor case 10 in this embodiment. The dehumidification rotor case 10 has the first to fourth chambers 12, 13, 19 and 20 as described above referring to FIG. 3. The duct 8 is connected to the first chamber 12 and the air inhaled from the outside of the housing 1a is sent to the first chamber 12 and the air is then made to pass through the passages 32 (see FIG. 3) in the dehumidification rotor 9. The air which reached the third chamber 13, which has been dehumidified, is discharged from the third chamber 13 through a duct 14 which is the dehumidification air-discharging passage mentioned above. The dehumidified air is discharged from the housing 1a through the duct 14.

On the other hand, the DE-regenerating air is sent by the second fan 5 to the passages 6b of the heat exchanger 6 through a duct 15. The passages 6b are the passages of the heat exchanger 6, which are the upper half of the passages running horizontally in the heat exchanger 6. The DE-regenerating air after passing through the passages 6b is sent to a chamber 17 having a heater 16 and heated with the heater 16. The heated DE-regenerating air is then sent to the second chamber 19 in the dehumidification rotor case 10 through a duct 18.

The second chamber 19 and the fourth chamber 20 are smaller than the first chamber 12 and the third chamber 13, and the DE-regenerating air sent to the second chamber 19 then passes through the passages 32 (see FIG. 3) of the dehumidification rotor 9 to reach the fourth chamber 20.

The DE-regenerating air which reached the fourth chamber 20 is then sent to the passages 6c of the heat exchanger 6 through a chamber 23 provided above the heat exchanger 6. The passages 6c are the passages of the heat exchanger 6, which run in the vertical direction of the heat exchanger 6. In the heat exchanger 6, the passages 6c running in the vertical direction and the passages 6a and 6b running in the horizontal direction are arranged alternately. That is, the passages 6a and 6b are arranged in vertical layers which are arranged with an interval, and the gaps between each of the vertical layers harboring the horizontal passages 6a and 6b define the vertical passages 6c.

When the DE-regenerating air passes down through the passages 6c, the DE-regenerating air is cooled and the moisture therein is condensed. After passing through the passages 6c, the DE-regenerating air reaches a chamber 25 containing a drain pan 24 arranged below the heat exchanger 6. The DE-regenerating air is then sent to the second fan 5 through a duct 26, and circulates again as described above.

Figure 6:
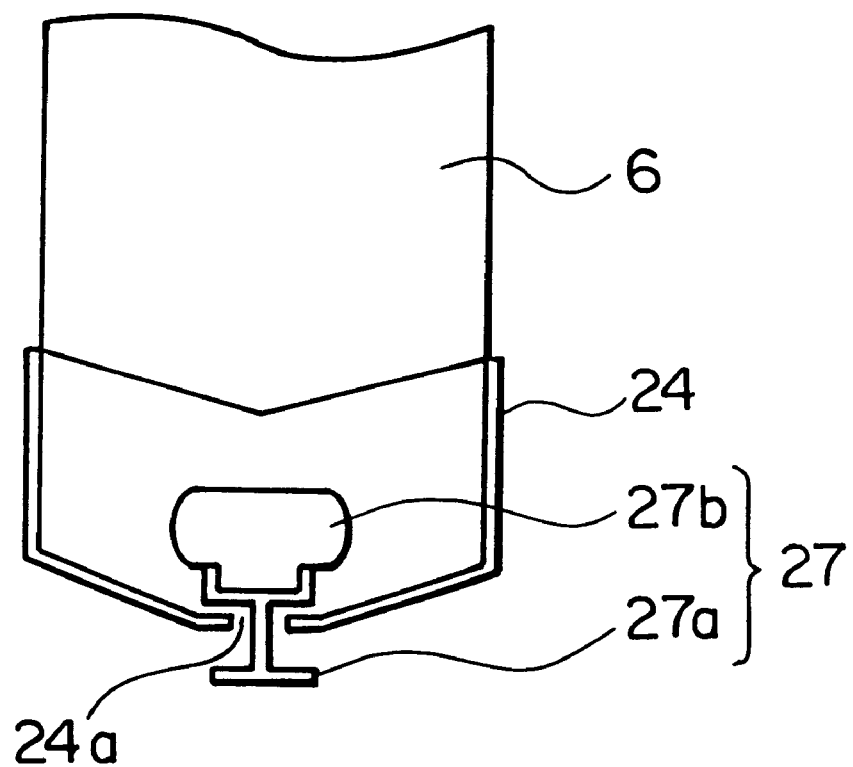
FIG. 6 is a schematic view showing the structure of the drain pan employed in a preferred embodiment of the dehumidification apparatus according to the present invention shown in FIG. 5.

The condensed moisture generated by the cooling of the DE-regenerating air after regeneration of the dehumidification rotor 9 is dropped on the drain pan 24. As shown in FIG. 6, a water-draining hole 24a is formed in the bottom center of the drain pan 24 and a float valve 27 is mounted on the water-draining hole 24a. The float valve 27 comprises a valve body 27a which opens and closes the water-draining hole 24a, and a float 27b mounted on the valve body 27a. When the water is accumulated in the drain pan 24, the float 27b, and accordingly, the valve body 27a are floated so that the valve is opened, and the water accumulated in the drain pan 24 is discharged into the container 2 through the water-draining hole 24a.

In operation, an electric power source (not shown) is turned on to drive the fan motor 3 and to heat the heater 16. By the fan motor 3, the first fan 4 and the second fan 5 are rotated. The air inhaled into the housing 1a through an inlet (not shown) by the first fan 4 reaches the dehumidification rotor 9 through passages 6a of the heat exchanger 6, and is dehumidified when it passes through the passages 32 of the dehumidification rotor 9. The dehumidified air is discharged from an outlet (not shown) by the first fan 4. By this dehumidification, the dehumidification rotor 9 absorbs the moisture in the air and the region of the rotor 9 between the first chamber 12 and the third chamber 13 becomes heavier than the region of the rotor 9 between the second chamber 19 and the fourth chamber 20, so that the rotor 9 naturally rotates in the direction shown by an arrow in FIG. 5.

On the other hand, the DE-regenerating air driven by the second fan 5 reaches the heater 16 through the passages 6b of the heat exchanger 6, and heated by the heater 16. The heated DE-regenerating air then passes through the passages 32 in the rotor 9. The rotor 9 is naturally rotated by gravity because of the weight of the absorbed moisture as mentioned above, so that the region of the rotor 9 between the first chamber 12 and the third chamber 13 comes to the position between the second chamber 19 and the fourth chamber 20. Since the heated DE-regenerating air passes through the passages 32 which has already absorbed the moisture, the moisture is given to the heated DE-regenerating air so that the region of the rotor 9 between the second chamber 19 and the fourth chamber 20 is regenerated, that is, this region of the rotor 9 regains the ability to absorb moisture from the air to be dehumidified. The thus regenerated region is then moved to the position between the first chamber 12 and the third chamber 13 by the natural rotation mentioned above, and absorbs the moisture in the air to be dehumidified as mentioned above.

The DE-regenerating air after regeneration of the rotor 9, which has a high temperature and high humidity, then passes through the passages 6c of the heat exchanger 6 and cooled during the passage through the passages 6c by exchanging heat with the air passing through the passages 6a and 6b. By this cooling, dew drops are formed on the surfaces of the passages 6c.

The DE-regenerating air after passage through the passages 6c has a temperature higher than the air passing through the passages 6a, and has a relative humidity of 100%, so that its absolute humidity is higher than that of the air outside the housing 1a. The DE-regenerating air thus having a high humidity is inhaled by the second fan 5 and is sent to the duct 15 to circulate the above-described route without being discharged from the housing 1a.

The dew drops formed on the surfaces of the passages 6c of the heat exchanger 6 are collected in the drain pan 24. The water-draining hole 24a formed in the bottom of the drain pan 24 is stopped by the float valve 27 so as to prevent air flow, but when the water (dew drops) accumulates in the drain pan 24, the float 27b is floated, so that the valve is opened. As a result, the water is drained into the container 2 through the water-draining hole 24a.

The amount of the water accumulated in the container 2 is the dehumidification amount of this dehumidification apparatus. When the water accumulates to an appropriate level, the container 2 is taken out of the housing 1a, and the water is discarded.

Figure 7:
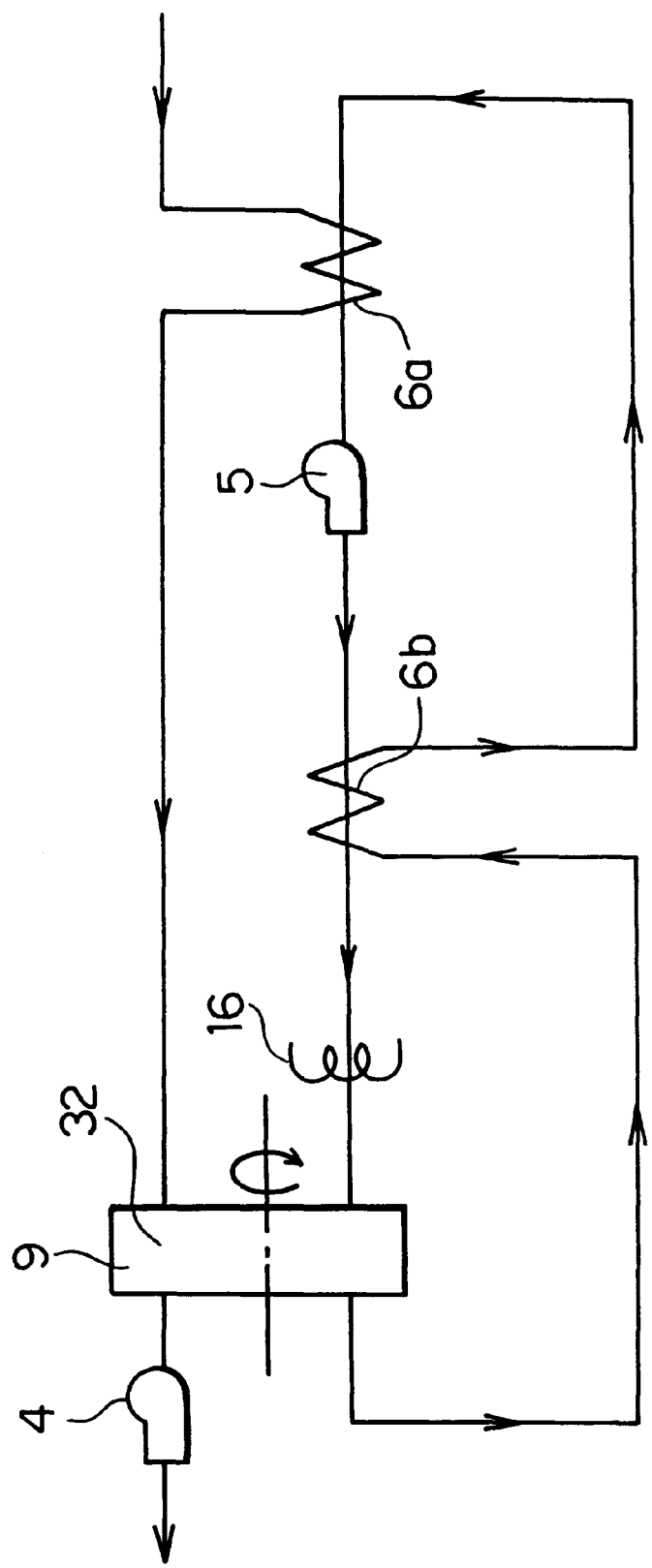
FIG. 7 shows a circuit of the dehumidification apparatus according to the present invention shown in FIG. 5.

The circuit of this embodiment is shown in FIG. 7. It may be well understood from FIG. 7 that the circulation route of the DE-regenerating air is separate from the path of the air to be dehumidified and the dehumidified air, so that the DE-regenerating air is not substantially mixed with the air to be dehumidified and the dehumidified air.

Figure 8:
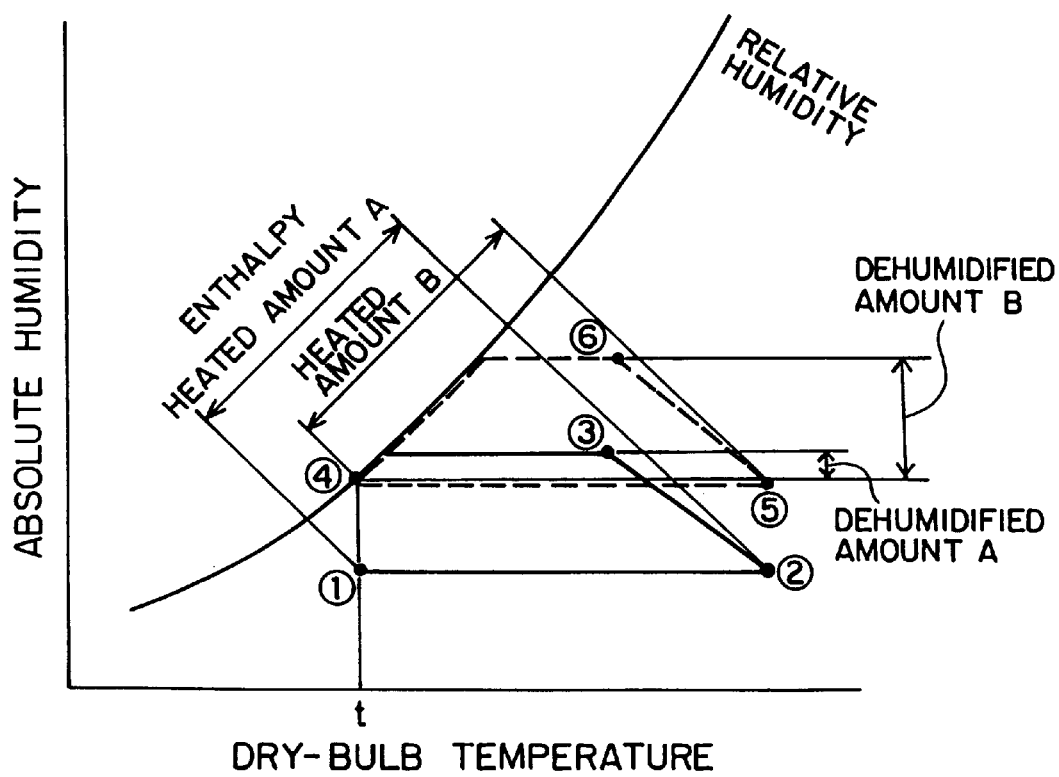
FIG. 8 is a psychrometric chart of the present invention and of the known dehumidification apparatus shown in FIG. 1.

A psychrometric chart of the present invention and the above-described prior art is shown in FIG. 8.

With the known apparatus described above, the air at the position ① is inhaled into the apparatus and heated by the heat exchanger E and the heater G to have a high temperature (position ②). The air is then passed through the dehumidification rotor C to become humid (position ③), and then cooled by the heat exchanger E. Assuming the heat exchange efficiency is 100% for the purpose of comparison with the present invention, the air is cooled to the temperature t (position ④), and the moisture of the dehumidification amount A is condensed to form dew.

On the other hand, with the apparatus according to the present invention, the temperature of the DE-regenerating air at the exit of the passages 6c of the heat exchanger 6 is "t" if the heat exchange efficiency is 100%, and the relative humidity is 100% (position ④). By heating this DE-regenerating air with the same energy as used in the known apparatus just mentioned above (heated amount B), the air comes to have a high temperature (position ⑤). By passing through the dehumidification rotor 9, the air becomes humid (position ⑥), and by cooling the humid air by the heat exchanger to the temperature t (position ④), the moisture of the dehumidification amount B is condensed to form dew.

As can be seen from FIG. 8, by employing DE-regenerating air which circulates without being discharged from the apparatus, the dehumidification amount is larger than that of the known apparatus when the same energy is used for heating.

It will be apparent for those skilled in the art that the dehumidification apparatus according to the present invention is not restricted to the embodiment described above. For example, although the DE-regenerating air is passed through the passages 6b before being heated by the heater 16 in the above-described embodiment, this passage through the heat exchanger is not necessary. Further, to cool the DE-regenerating air after regeneration of the DE, the air outside the housing 1a may be introduced into the heat exchanger 6.

Figure 5:
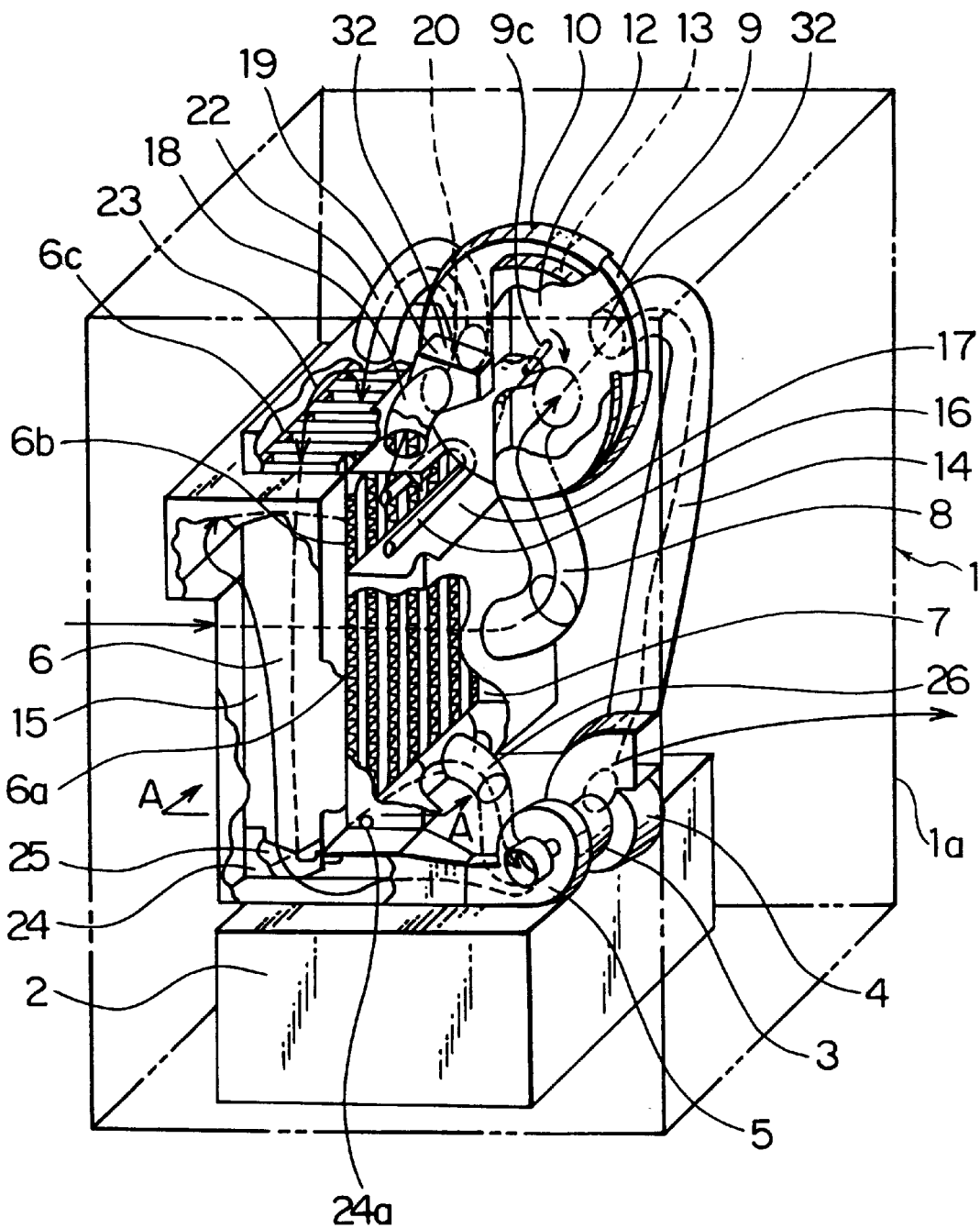
FIG. 5 is a partially cut off perspective view of a preferred embodiment of the dehumidification apparatus according to the present invention.
Figure 9:
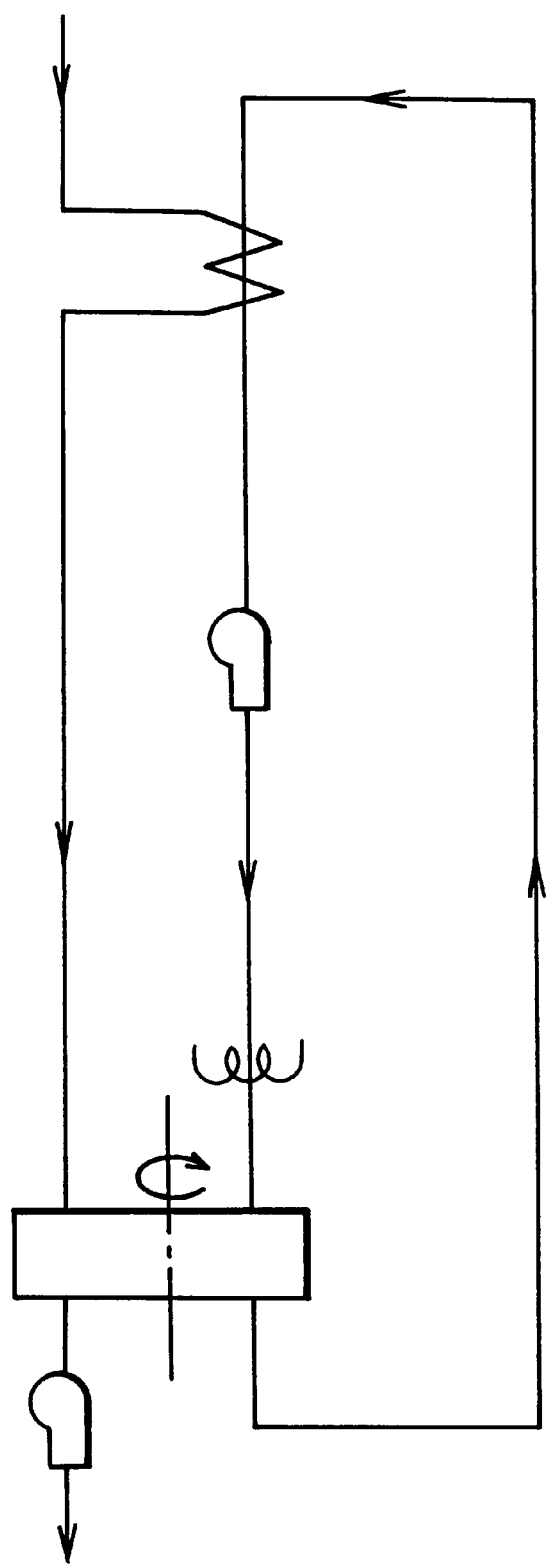
FIG. 9 shows a circuit of the dehumidification apparatus according to an embodiment of the present invention.
Figure 10:
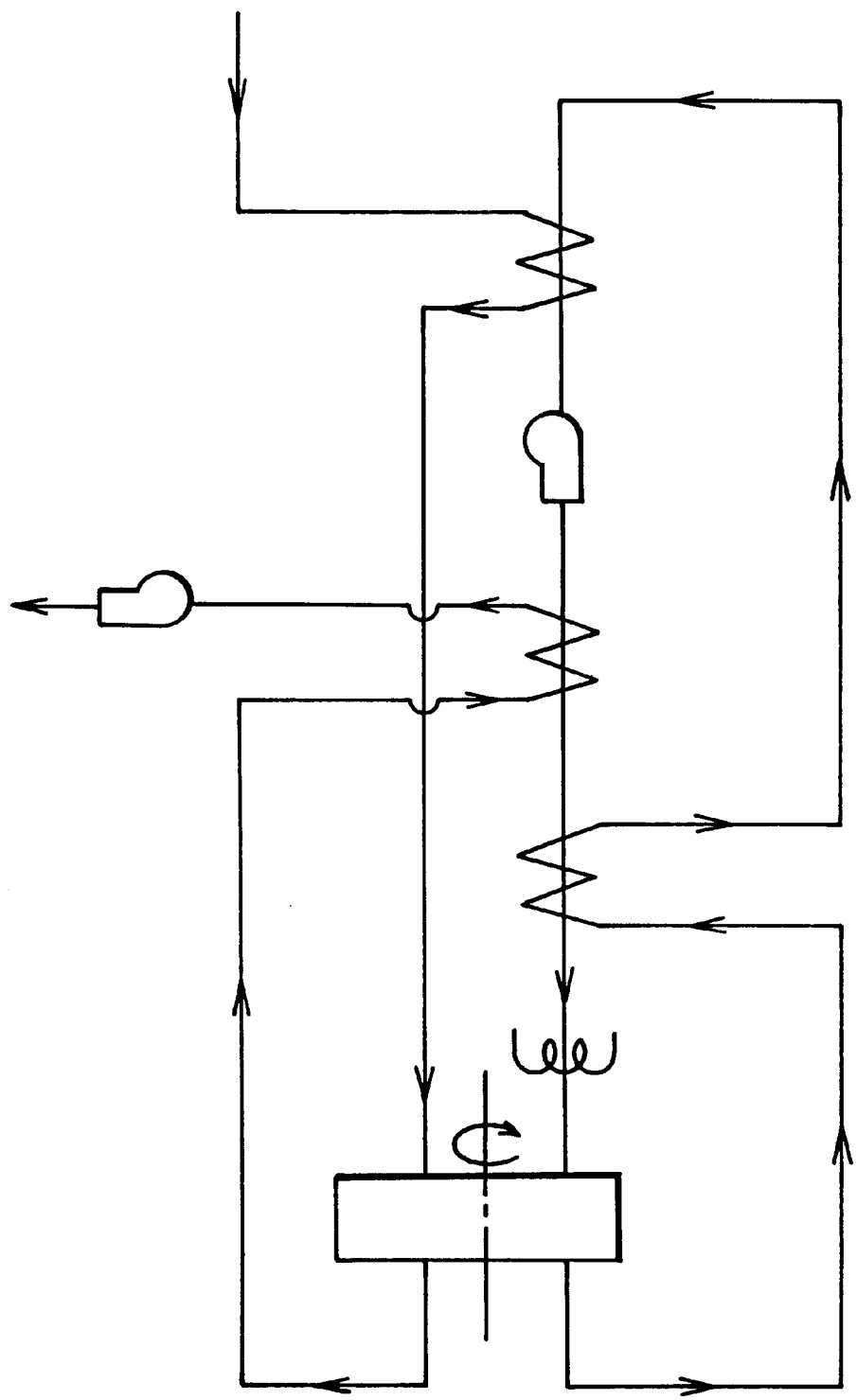
FIG. 10 shows a circuit of the dehumidification apparatus according to an embodiment of the present invention.
Figure 11:
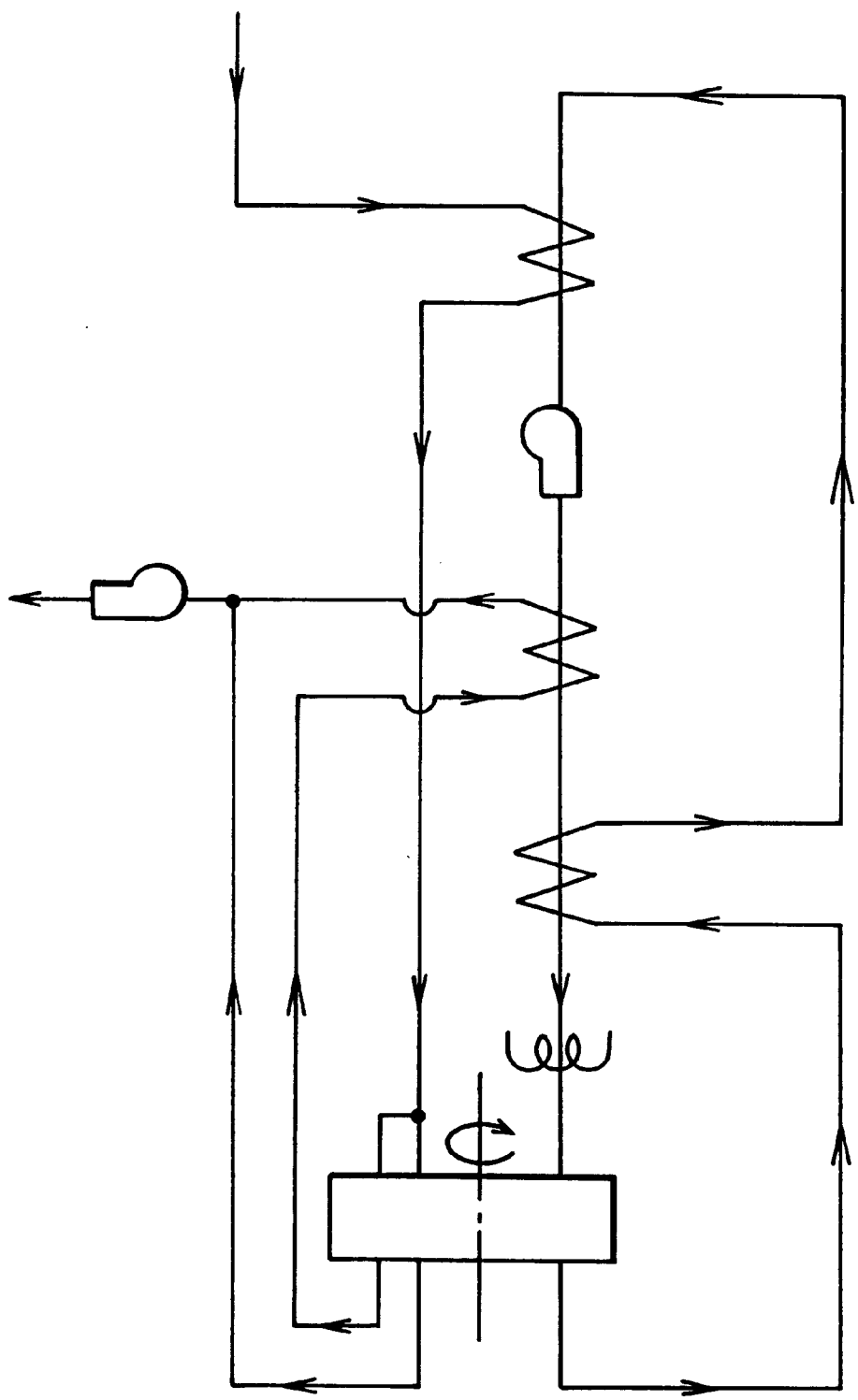
FIG. 11 shows a circuit of the dehumidification apparatus according to another embodiment of the present invention.
Figure 12:
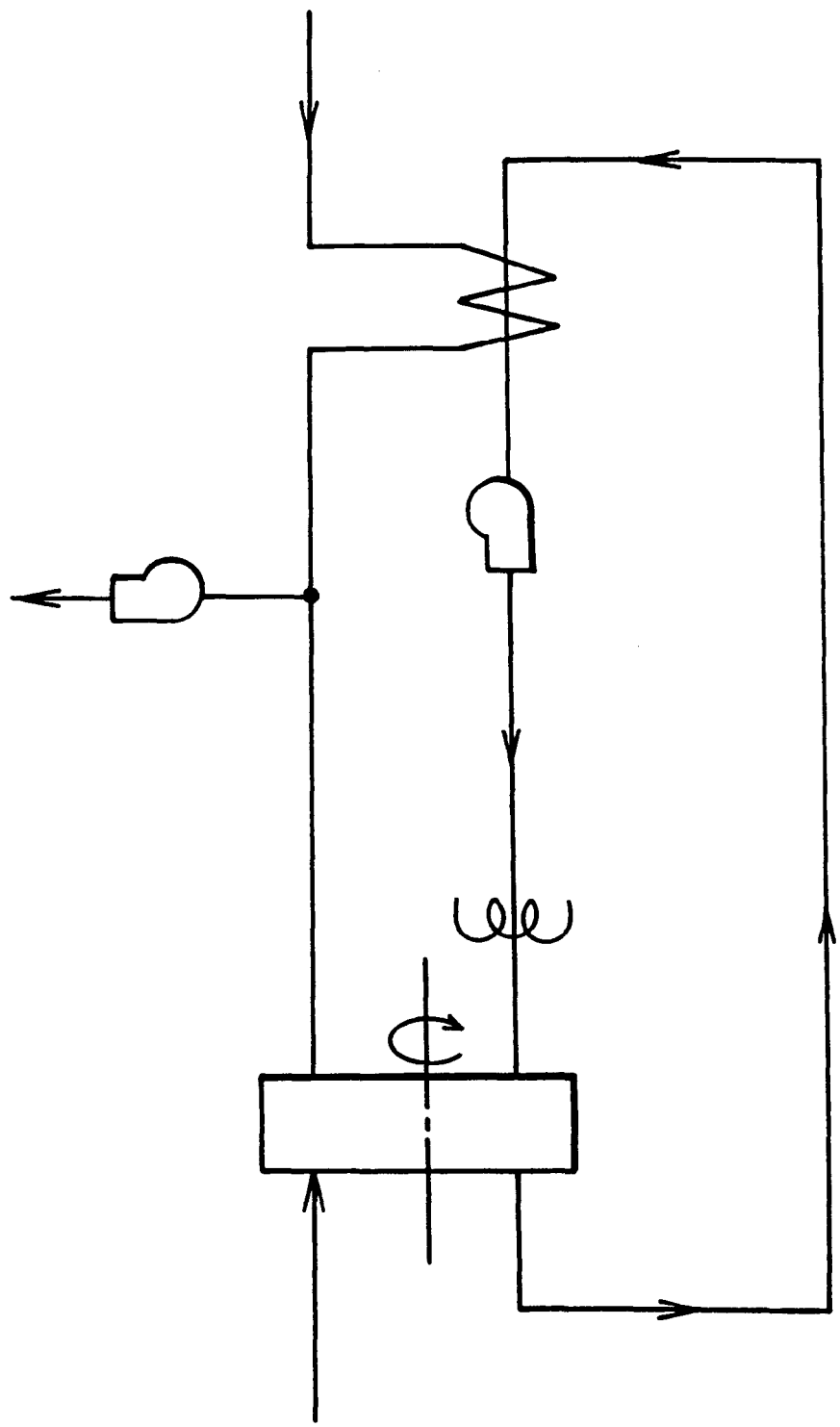
FIG. 12 shows a circuit of the dehumidification apparatus according to still another embodiment of the present invention.
Figure 13:
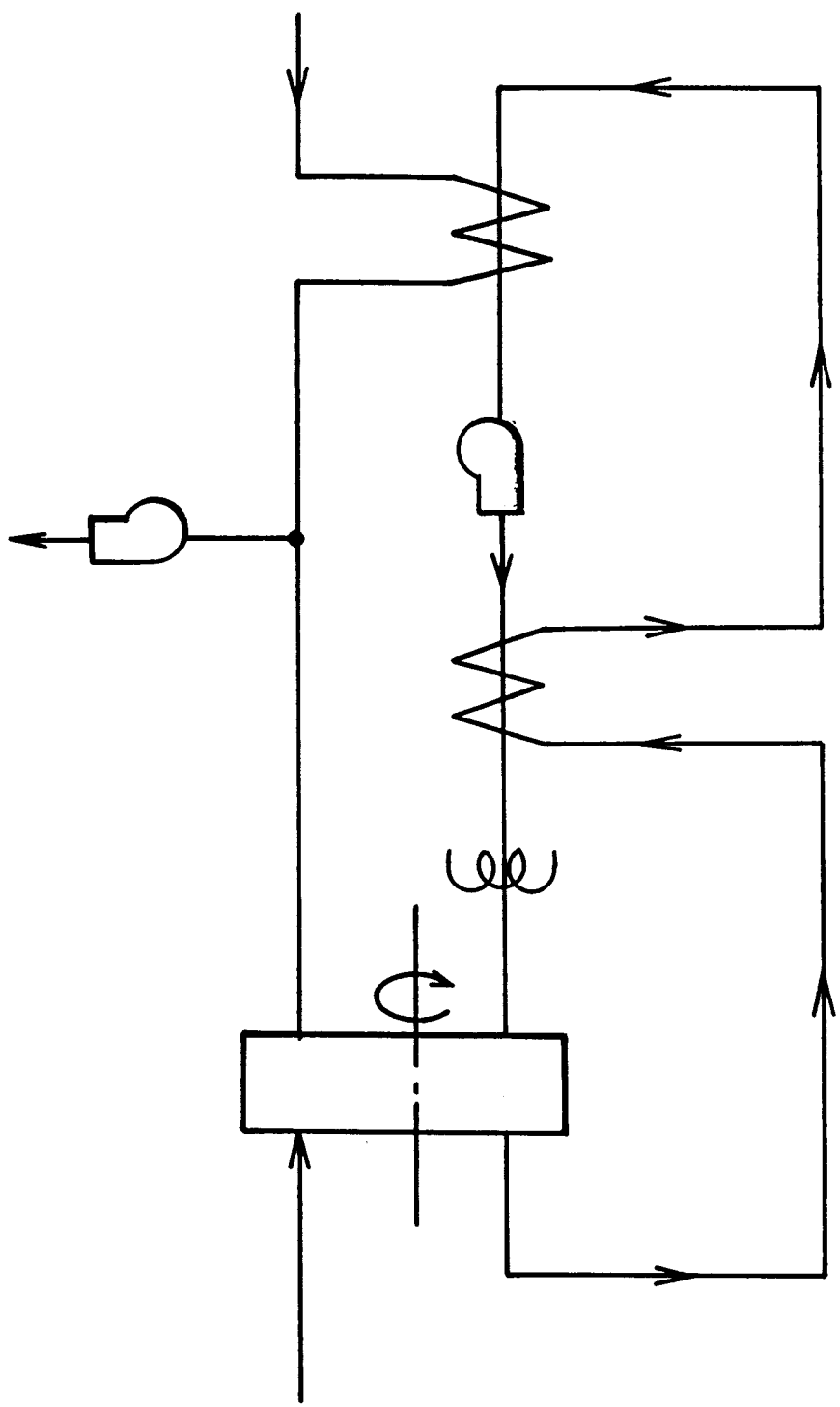
FIG. 13 shows a circuit of the dehumidification apparatus according to still another embodiment of the present invention.
Figure 14:
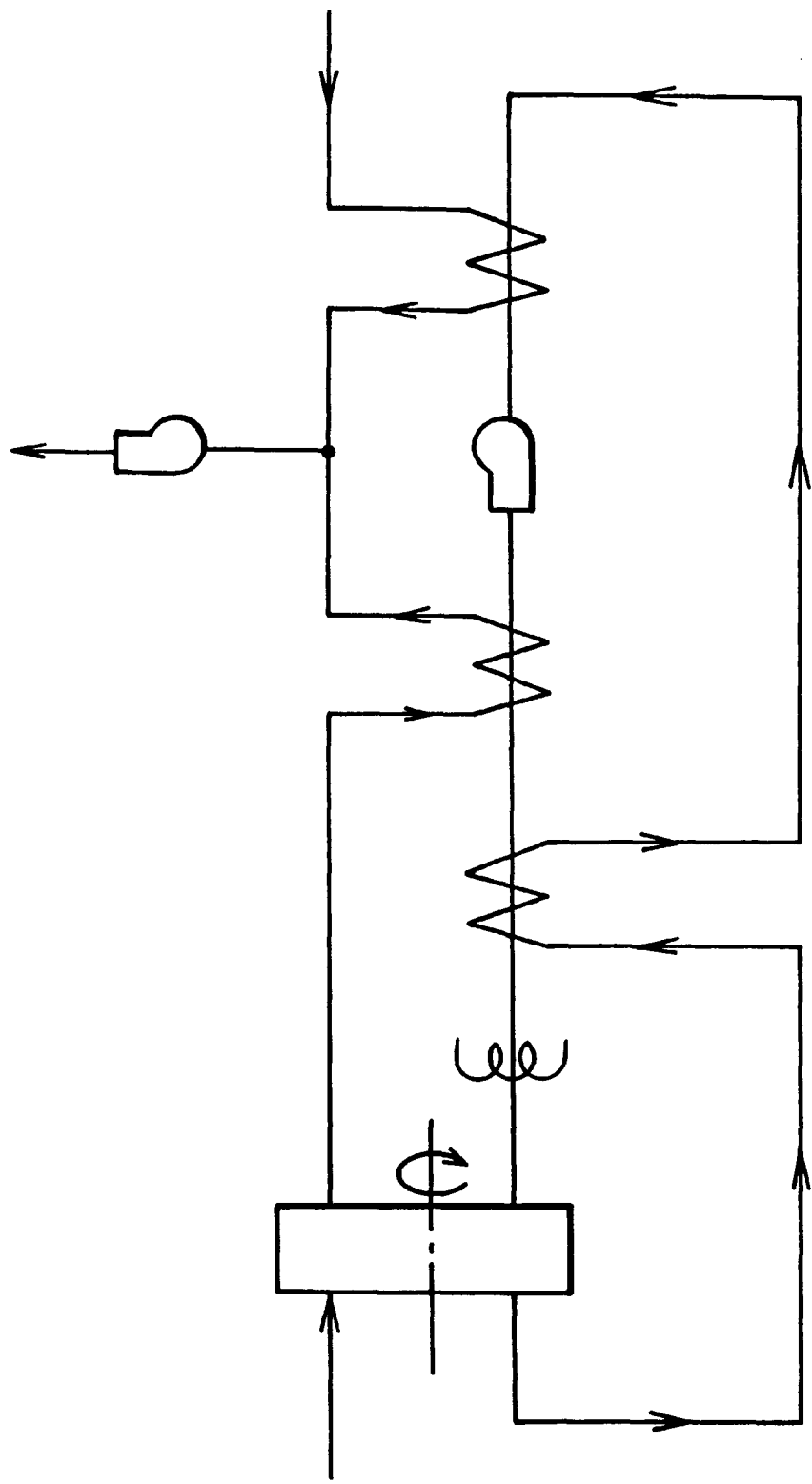
FIG. 14 shows a circuit of the dehumidification apparatus according to still another embodiment of the present invention.

As shown in FIGS. 5 and 7, in the above-described embodiment, heat is exchanged between the DE-regenerating air after cooled and before heated and the DE-regenerating air after regeneration of the DE-regenerating air, thereby cooling the DE-regenerating air after regeneration of the DE and preheating the DE-regenerating air before heated by the heater. However, as shown in FIG. 9, this heat exchange may be omitted, and the DE-regenerating air after regeneration of the DE may be cooled only with the air to be dehumidified. Further, as shown in FIGS. 10 and 11, the air to be dehumidified which is heated by the heat exchange with the DE-regenerating air after regeneration of the DE and after giving heat to the DE-regenerating air before being heated with the heater may be sent to the DE and may be further heated by the reaction heat generated when the DE absorbs moisture. The thus further heated air may then be subjected to heat exchange with the cooled DE-regenerating air thereby recovering the heat generated by the cooling and moisture absorption.

Further, as shown in FIGS. 12 to 15, the route for sending the air to be dehumidified to the DE and the route for sending cooling air to the heat exchanger for cooling the DE-regenerating air after regeneration of the DE may be separated. By this, the decrease in the dehumidification efficiency due to the decrease in the relative humidity caused by heating the air to be dehumidified by the heat exchange with DE-regenerating air after regeneration of the DE and after giving heat to the DE-regenerating air before being heated with the heater can be avoided. Further, since the DE and the heat exchanger for cooling the DE-regenerating air after regeneration of the DE are arranged in parallel, not in series as in the embodiment shown in FIGS. 7, 9 to 11, the pressure drop is decreased so that the pressure in the vicinity of the DE is close to the pressure outside the housing, and the pressure of the DE-regenerating air is close to the pressure outside the housing. As a result, mixing of the DE-regenerating air and the air outside the housing hardly occurs, so that the decrease in the dehumidification efficiency can be avoided.

Figure 15:
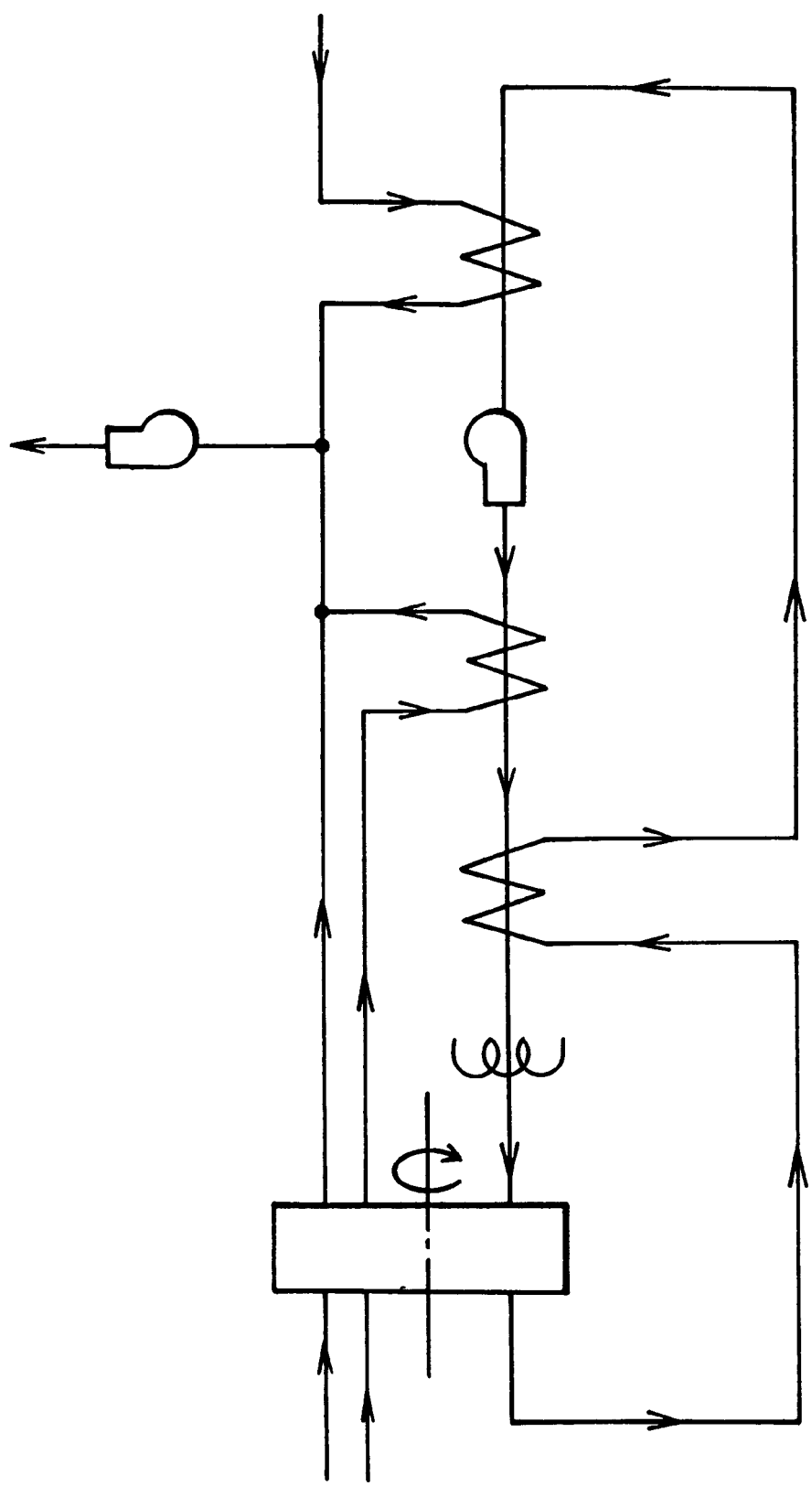
FIG. 15 shows a circuit of the dehumidification apparatus according to still another embodiment of the present invention.

Further, fan motors may be arranged in appropriate positions in the route and the heat generated by the motor may be recovered. Still further, as shown in FIGS. 11 and 15, the exit of the dehumidified air may be divided and only the hot air may be subjected to heat exchange with the DE-regenerating air. That is, since the DE immediately after regeneration rapidly absorbs moisture, the temperature of the air dehumidified by the DE immediately after regeneration is higher than the temperature of the air dehumidified by the DE which has already absorbed some amount of moisture. Thus, the exit of the dehumidified air may be divided such that the air dehumidified by the DE immediately after regeneration is divided with the air dehumidified by the DE which has already absorbed moisture, and only the hotter air dehumidified with the DE immediately after regeneration may be subjected to heat exchange with the DE-regenerating air.

According to the apparatus described above, since the DE-regenerating air entirely used for regeneration of the dehumidification element is separately employed and is circulated without being discarded and without being substantially mixed with the air to be dehumidified or with the dehumidified air, the dehumidification efficiency is significantly higher than those with the conventional dehumidification apparatuses wherein the humid air is discharged to the outside of the apparatus.

Further, with the apparatus according to the present invention, since the air to be dehumidified and the DE-regenerating air are driven by separate fans, the pressures in the first chamber 12 and the second chamber 19 are the same, and the pressures in the third chamber 13 and the fourth chamber 20 are the same. Therefore, air does not flow between the first chamber 12 and the second chambers 19, and between the third chamber 13 and the fourth chamber 20. As a result, even if the gap "d" is relatively large, the DE-regenerating air is not substantially mixed with the air to be dehumidified or with the dehumidified air. Therefore, the dehumidification efficiency is high and the tolerance of the dimensions of the dehumidification rotor 9 and the rotor case 10 is large, which is very advantageous in assembling the apparatus. Still further, since the gap "d" may be relatively large, it can be avoided that the rotor 9 does not rotate because of the dust accumulated between the rotor 9 and the rotor case 10.

I claim:

1. A dehumidification apparatus comprising:

a housing;

a dehumidification element within said housing which reversibly absorbs moisture in air to be dehumidified, wherein said dehumidification element is in the form of a plate or a block and is made of a material which has a moisture-absorbing material at least at its surfaces, and which has a number of passages in the direction of thickness of the plate or the block, and said air can pass through said passages, so that said dehumidification element is rotatable, a region of a first surface of the said dehumidification element at which said passages are opened is covered with a first chamber and another region of said first surface is covered with a second chamber, and a region of a second surface of said dehumidification element opposite to said first surface is covered with a third chamber and another region of said second surface is covered with a fourth chamber, said air to be dehumidified being introduced into said first chamber, passing through said passages to reach said third chamber, and being discharged from said third chamber to the outside of said housing through a dehumidified air-discharging passage;

a passage for circulating air for regeneration of the dehumidification element, which is communicated to said dehumidification element;

means for introducing the air to be dehumidified to said dehumidification element; and a dehumidified air-discharging passage for discharging the air dehumidified by said dehumidification element to the outside of said housing, which is communicated to said dehumidification element and to the outside of said housing;

said passage for circulating air for regeneration of the dehumidification element is provided with means for cooling the air for regeneration of the dehumidification element after regenerating the dehumidification element so as to condense the moisture removed from the dehumidification element; means for removing water generated by condensation of moisture from the air for regeneration of the dehumidification element; a heater for heating the air for regeneration of the dehumidification element; a heater for heating the air for regeneration of the dehumidification element after removing the water generated by condensation of moisture; and driving means for circulating the air for regeneration of the dehumidification element; said passage for circulating air for regeneration for regeneration of the dehumidification element is closed anywhere except for the vicinity of said dehumidification element, wherein an inner side of the first chamber and an inner side of the second chamber are connected through a first gap between a first separation portion and the first surface of the dehumidification element, and an inner side of the third chamber and an inner side of the fourth chamber are connected between a second gap between a second separation portion and the second surface of the dehumidification element.

2. The apparatus according to claim 1, wherein said first to fourth chambers are formed by providing hollow portions in a cover which encloses the entire dehumidification element, and said first to fourth chambers are spaced apart from each other.

3. The apparatus according to claim 1, wherein said means for cooling the air for regeneration of the dehumidification element after regenerating the dehumidification element so as to condense the moisture removed from the dehumidification element is a heat exchanger, and heat is exchanged between said air for regeneration of the dehumidification element after regeneration of the dehumidification element and the air to be dehumidified.

4. The apparatus according to claim 1, wherein said dehumidification element is in the form of a rotatable disk.

5. The apparatus according to claim 1, wherein said means for introducing the air to be dehumidified to the dehumidification element is a first fan, and the apparatus further comprising a second fan for circulating said air for regeneration of the dehumidification element.

6. The apparatus according to claim 1, wherein the moisture absorbing material is selected from the group consisting of calcium chloride, lithium chloride, silica gel, and molecular sieves.

7. The apparatus according to claim 1, wherein the passages have a diameter of about 0.5–3 mm.

8. The apparatus according to claim 4, wherein the disk comprises a spirally wound corrugated board.

9. The apparatus according to claim 1, wherein the first gap and the second gap are each about 1 mm to 4 mm.

10. The apparatus according to claim 1, wherein a flexible rubber or plastic film is disposed in the first gap and the second gap.

11. The apparatus according to claim 1, wherein said first to fourth chambers and said first and second separation portions are formed by providing hollow portions in a cover which encloses the entire dehumidification element, and a gap between an upper portion of the dehumidification element and the cover and a gap between a lower portion of the dehumidification element are formed so that the gaps are each about 1–4 mm.

12. The apparatus according to claim 1, wherein a distance between the first and second chambers are about the same as a distance between the third and fourth chambers, and the distances are not shorter than a thickness of the dehumidification element.

13. The apparatus according to claim 12, wherein the distances are about 1 to 5 times the thickness of the dehumidification element.

14. A method for dehumidifying air comprising the steps of:

(i) providing a dehumidification apparatus according to claim 1;

(ii) contacting a portion of the dehumidification element which reversibly absorbs moisture in the air, with the air to be dehumidified being introduced into said first chamber, passing through said passages to reach said third chamber, and being discharged from said third chamber to the outside of said housing through the dehumidified air discharging passage, said air for regeneration of the dehumidification element being introduced into said second chamber, passing through said passages to reach said fourth chamber, and being circulated to a cooling step from said fourth chamber, said regions of the dehumidification element covered with said first and third chambers, respectively, are moved by rotation of said dehumidification element to the position covered with said second and fourth chambers, respectively;

(iii) discharging air to the outside of said housing, which air was dehumidified by the contact with said dehumidification element;

(iv) regenerating said dehumidification element by contacting said dehumidification element after absorbing the moisture in said air with heated air for regeneration of the dehumidification element so as to remove the moisture from said dehumidification element, wherein said air for regeneration of the dehumidification element is not mixed with the air to be dehumidified or with the dehumidified air anywhere except for the vicinity of said dehumidification element;

(v) reusing the dehumidification element in the step (ii), which was regenerated by the step (iv);

(vi) cooling the air for regeneration of the dehumidification element after removing moisture from the dehumidification element in the step (iv) so as to condense the moisture, and removing the generated water from the air for regeneration of the dehumidification element; and (vii) circulating the air for regeneration of the dehumidification element from the step (vi) from which the water generated by condensation of moisture was removed, to the step (iv), wherein said air for regeneration of the dehumidification element is not substantially mixed with the air to be dehumidified or with the dehumidified air.

15. The method according to claim 14, wherein said first to fourth chambers are formed by providing hollow portions in a cover which encloses the entire dehumidification element, and said first to fourth chambers are spaced apart from each other.

16. The method according to claim 14, wherein said air for regeneration of the dehumidification element is cooled in the step (v) by giving heat of the air for regeneration of the dehumidification element to the air to be dehumidified in a heat exchanger.

17. The method according to claim 14, wherein the moisture absorbing material is selected from the group consisting of calcium chloride, lithium chloride, silica gel, and molecular sieves.

18. The method according to claim 14, wherein the passages have a diameter of about 0.5–3 mm.

* * * * *